J. E. THROPP.
BEAD ADJUSTING DEVICE.
APPLICATION FILED OCT. 20, 1908.

1,131,173.

Patented Mar. 9, 1915.

Witnesses:
F. George Barry
Henry Thieme

Inventor:
John E. Thropp
By Brown & Duvall
his Attorneys

UNITED STATES PATENT OFFICE.

JOHN E. THROPP, OF TRENTON, NEW JERSEY.

BEAD-ADJUSTING DEVICE.

1,131,173.      Specification of Letters Patent.      Patented Mar. 9, 1915.

Application filed October 20, 1908. Serial No. 458,676.

*To all whom it may concern:*

Be it known that I, JOHN E. THROPP, a citizen of the United States, and resident of Trenton, in the county of Mercer and State of New Jersey, have invented a new and useful Bead-Adjusting Device, of which the following is a specification.

My invention relates to a bead adjusting device and more particularly to a device for placing the bead accurately in position on the tire where the latter is to be subsequently cured between side rings.

In making what is commonly known as a clencher tire, it is common to first build on the core the foundation of the tire, then place the clencher beads in position, then cover the foundation and clencher rings with outer wrappings of the tire and finally press these clencher rings and the tire adjacent thereto into close contact with the core during the process of vulcanization. It becomes a matter of the highest importance to have these beads which form the clencher edges of the tire located in exactly the right position through their entire length in order that the recesses in the molds which are intended to receive them may receive them without any radial pressure tending to displace them and it is to accomplish this accurate arrangement of the beads expeditiously and effectively that my present invention is directed. A practical embodiment of my invention is represented in the accompanying drawings, in which—

Figure 1:
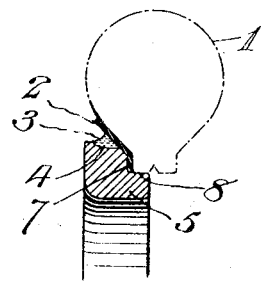
Figure 3:
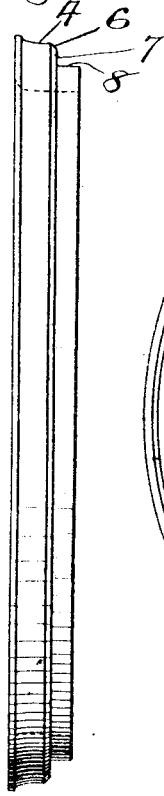
Figure 2:
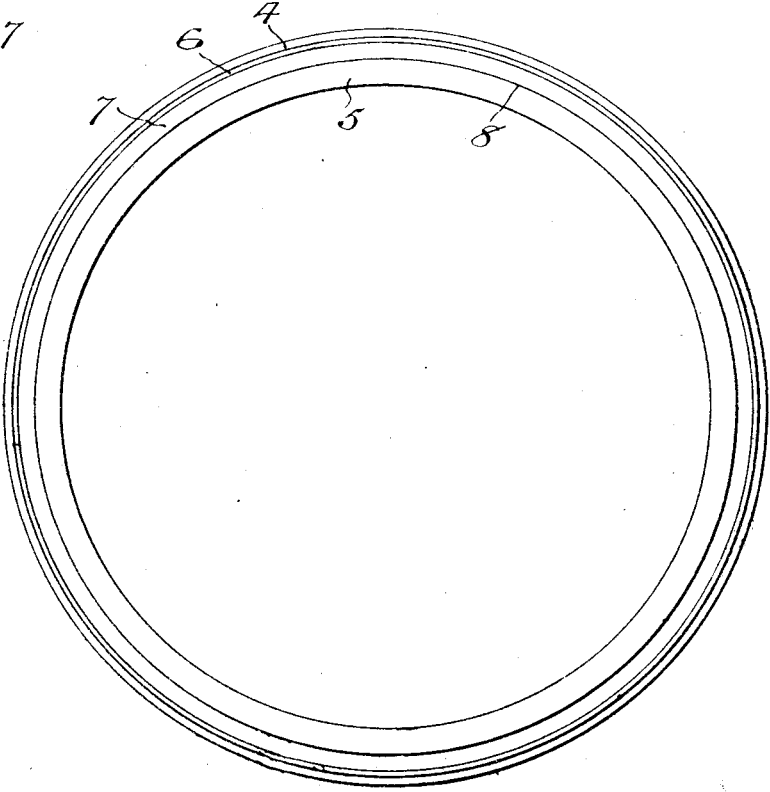

Figure 1 is a sectional view showing the bead adjusting ring in its relation to the core and bead as in use. Fig. 2 is a side elevation of the bead adjusting ring, and Fig. 3 is an edge elevation of the same.

The position of the core on which the tire is formed is indicated in broken lines by 1.

The base of the tire which is first laid on the core is denoted by 2 and is shown extending from the inner wall of the core outwardly a distance just sufficient to show the location of the bead.

The bead is denoted by 3 and is seated in the shallow curved recess 4 formed in the periphery of the bead adjusting ring 5. The periphery of the bead adjusting ring is further provided with a beveled portion 6 which is intended to rest against the tire foundation 2 immediately within the position of the bead and the said ring is further provided with a radial shoulder 7 and a lateral shoulder 8 the former for resting against the tire foundation 2 near the inner edge of the core and the latter to extend within the core in close proximity to the inner wall of the core.

In practice, the tire foundation having been laid on the core 1, the bead may be placed in position on the shallow curved recess 4 on the bead adjusting ring 5 and the latter may then be moved laterally into position with respect to the core 1, the ring itself being adjusted accurately in position by the entrance of the shoulder 8 within the inner wall of the core and when pressed laterally against the tire foundation 2, the base of the bead will be brought into intimate contact with the tire foundation 2 under such pressure as will cause the bead to adhere to the tire foundation 2 which is commonly formed of unvulcanized rubber and the bead adjusting ring may then be removed, leaving the bead in its proper position with respect to the core and the tire formed thereon.

It is intended that the bead adjusting ring shall conform, so far as its bead seat 4 is concerned, to the mold which subsequently is moved laterally in position for vulcanizing purposes so that if the bead be set in position by the bead adjusting device, it is a matter of certainty that the bead will be received within the bead recess in the mold without any liability of displacement or distortion.

What I claim is:—

1. Tire forming apparatus comprising in combination a core upon which the tire may be formed, a bead adjusting device having an annular seat thereon for receiving and carrying a clencher bead and provided with means for centering the device with respect to the core, the said device being arranged to move laterally into position to bring the bead thereon into close contact with a tire on the core.

2. Tire forming apparatus comprising in combination a core upon which the tire may be formed, a bead adjusting device comprising an annular ring having a seat on its periphery for the reception of a bead, and a shoulder thereon for centering the ring with respect to the core, whereby a bead on the core may be accurately located on a tire formed on the core by a lateral movement of the bead adjusting device.

3. A tire forming machine comprising in combination a core upon which the tire may be formed, a bead applying form adapted to hold a formed bead ring and to be placed adjacent to fabric on said core, and means for centering the said form with respect to said core.

In testimony, that I claim the foregoing as my invention, I have signed my name in presence of two witnesses, this sixteenth day of October 1908.

JOHN E. THROPP.

Witnesses:
 RACHEL SUMMER,
 JOHN V. BOYD.